United States Patent
Papini et al.

(10) Patent No.: US 6,574,466 B2
(45) Date of Patent: *Jun. 3, 2003

(54) METHOD OF SECURING TRANSMISSION OF INFORMATION UTILIZING TIME VARIANT TECHNIQUES WITH ERROR DETECTING CODE

(75) Inventors: Hélène Papini, Orsay (FR); François Simon, La Norville (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,779

(22) Filed: Jan. 5, 1999

(65) Prior Publication Data

US 2002/0006789 A1 Jan. 17, 2002

(30) Foreign Application Priority Data

Jan. 8, 1998 (FR) .............................. 98 00119

(51) Int. Cl.$^7$ ............................... H04M 1/66
(52) U.S. Cl. ..................... 455/410; 455/411; 380/247; 713/181
(58) Field of Search ............... 455/500, 12.1, 455/410, 411, 422, 427, 428, 429, 430, 226.2, 226.4, 67.1, 67.3; 370/342, 335, 352; 380/247, 270, 248, 249, 250, 258, 273, 35–36, 43, 284, 286, 277, 269; 340/5.8, 5.2, 5.21, 5.25, 5.26; 713/201, 150, 160, 162, 181

(56) References Cited

U.S. PATENT DOCUMENTS

| 4,267,592 A | * | 5/1981 | Craiglow ................... 370/109 |
|---|---|---|---|
| 4,935,961 A | * | 6/1990 | Gargiulo et al. ............... 380/21 |
| 4,985,900 A | * | 1/1991 | Rhind et al. ................... 375/10 |
| 5,142,577 A | * | 8/1992 | Pastor ........................ 380/23 |
| 5,172,414 A | * | 12/1992 | Reeds et al. .................. 380/45 |
| 5,416,841 A | * | 5/1995 | Merrick ....................... 380/29 |
| 5,574,785 A | * | 11/1996 | Ueno et al. .................... 380/2 |
| 5,668,880 A | * | 9/1997 | Alajajian ..................... 380/49 |
| 5,748,742 A | * | 5/1998 | Tisdale et al. ................. 380/49 |
| 5,812,639 A | * | 9/1998 | Bartholomew et al. ..... 379/207 |
| 5,841,873 A | * | 11/1998 | Lockhart et al. ............ 713/181 |
| 5,875,108 A | * | 2/1999 | Hoffberg et al. ............ 364/146 |
| 6,182,214 B1 | * | 1/2001 | Hardjono .................... 713/163 |
| 6,289,037 B1 | * | 9/2001 | Gibbons et al. ............ 375/130 |
| 6,307,837 B1 | * | 10/2001 | Ichikawa et al. ........... 370/230 |
| 6,453,159 B1 | * | 9/2002 | Lewis ........................ 455/411 |

FOREIGN PATENT DOCUMENTS

| FR | 2 694 465 A1 | | 2/1994 | |
| WO | WO-93/11619 | * | 6/1993 | .............. H04L/9/00 |

OTHER PUBLICATIONS

Hwang Tzonelih et al, "Secret Error–Correcting Codes (SECC)" Advances in Cryptology, Santa Barbara, Aug. 21–25, 1988, Jan. 1, 1988, pp. 540–563.

* cited by examiner

Primary Examiner—Edward F. Urban
Assistant Examiner—Tilahun Gesesse
(74) Attorney, Agent, or Firm—Sughrue Mion, PLLC

(57) ABSTRACT

A process for establishing secure communication between particular communicating units via a channel of a telecommunication network encodes data embodying information to be selectively transmitted from a transmitter unit to one or more particular receiver units prior to transmission using an error detecting code enabling reliable recovery of the information on reception. For security reasons, the error detecting code used to encode the information is encrypted using an enciphering key defined by application of a time dependent variation law. Alternatively, the error detecting code used to transmit information can be selected by application of a time dependent variation law.

9 Claims, 3 Drawing Sheets

METHOD OF SECURING TRANSMISSION OF INFORMATION UTILIZING TIME VARIANT TECHNIQUES WITH ERROR DETECTING CODE

BACKGROUND OF THE INVENTION

Field of the invention

The invention concerns a method of securing transmission of information via a telecommunication network and in particular an open network such as a network including radio links. The method is more particularly intended to be used to transmit information requiring high levels of reliability and high levels of security at one and the same time by virtue of their nature and/or their function.

There are many applications in which it is essential for the information received to correspond faithfully to that sent. In particular, this is required in many security systems where control information received must correspond to the information that was sent, for example. There is also a routine requirement for the transmission to be totally secure so that the recipients can be assured that information they receive has come without modification from sources authorized to send it. It is often also required for the information to be processed in such a manner that it remains confidential and can be used only by the intended recipients.

A prior art solution enables a receiver unit to determine if information it has received faithfully reproduces the original information transmitted. It involves the use of an error detecting code applied to the digital or digitized data to be transmitted prior to transmission. The data constituting the information is therefore transmitted by the transmitter unit together with the corresponding error code data.

It is then possible for a receiver unit to verify information received using the error code data accompanying the information.

Information is routinely transmitted to a receiver unit in a manner that is systematically redundant to enable it to verify its integrity by comparison when received.

A prior art solution enabling a unit receiving information to determine if the information has come without modification from an authorized transmitter unit involves the transmitter unit employing a first key to encipher information it sends to the receiver unit concerned. The receiver unit then deciphers the information using a second key.

The enciphering of information transmitted in the form of data by a transmitter unit to one or more receiver units can be defined by a formula such as: $C_i = T(K_j, M_l)$ in which $C_i$ corresponds to the encrypted information sent, $K_j$ is the enciphering key, $M_l$ is the information to be enciphered and T is the enciphering function.

The receiver units must decipher the data to recover the information addressed to them. Deciphering is generally obtained by means of an operation that can be defined by the formula: $M = T^{-1}(K_l, C_i)$ where M corresponds to the decrypted information, $K_l$ is the deciphering key and $T^{-1}$ is the deciphering function.

As is known in itself, the keys $K_j$ and $K_l$ can be identical to enable information to be enciphered before it is transmitted and deciphered after it is received by symmetrical operations. Choosing different enciphering keys $K_j$ for different transmitter units enables reliable identification thereof by the receiver unit or units to which enciphered information is transmitted.

Assigning a private deciphering key $K_l$ to a single receiver unit is of benefit from the security point of view when one or more transmitter units that communicate with the receiver unit use the same public information enciphering key $K_j$ enabling each transmitter unit to communicate confidentially with the receiver unit. To minimize the risk of security becoming degraded over a period of time, negotiation phases are routinely provided for choosing and changing keys, the negotiations involving the legitimately concerned parties and possibly a supervisor, in particular after a particular phase of use of the keys.

This is useful in particular when information is retransmitted.

Although retransmission has advantages from the reliability point of view, it is not advantageous from the security point of view in that repeating information increases the risk of modification of the information during transmission by an external cause and the risk of violation of the confidentiality of the information by a third party where such confidentiality is required.

Accordingly, the invention consists in a method of securing transmission of information via an open telecommunication network combining the reliability and security imperatives referred to hereinabove.

The method is more particularly intended to set up secure communication between communicating units via a telecommunication network channel.

SUMMARY OF THE INVENTION

In accordance with one feature of the invention, data conveying information to be selectively transmitted from a transmitter unit to one or more particular receiver units is encoded prior to transmission using an error detecting code adapted to enable reliable recovery of said information on reception; for security reasons, the error detecting code used for encoding said information is encrypted using an encrypting key defined by application of a time dependent variation law.

In accordance with another feature of the invention and as an alternative to the above process, the data conveying information to be selectively transmitted from a transmitter unit to one or more particular receiver units is encoded prior to sending using an error detecting code adapted to enable reliable recovery of said information on reception and the error detecting code used to transmit information is selected by application of a time dependent variation law.

The invention, its features and its advantages are explained in the following description given with reference to the single figure of the accompanying drawing.

DETAILED DESCRIPTION OF THE PREFERRED EMBODIMENT

Figure 1:
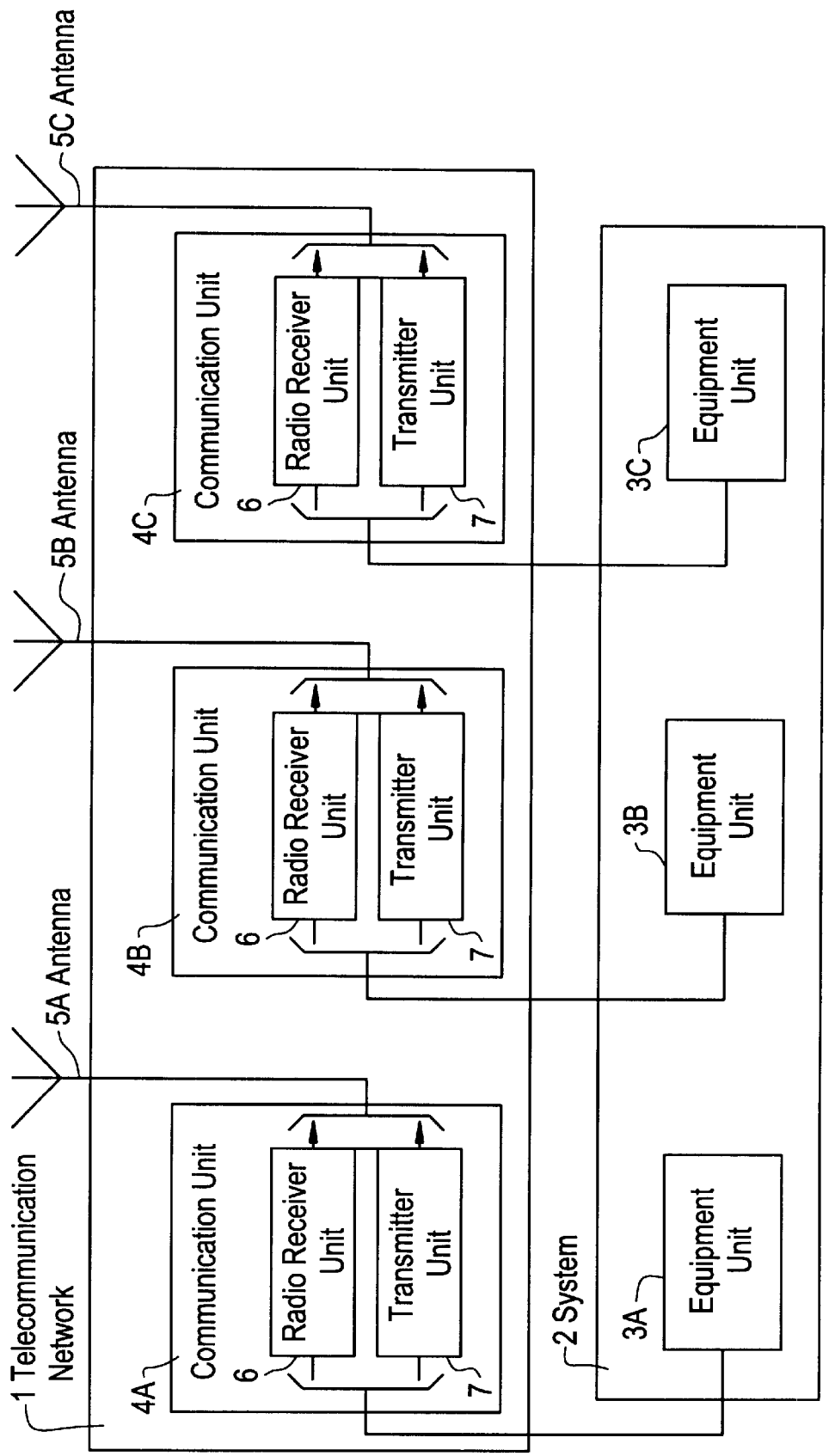
FIG. 1 shows a telecommunication network associated with a system comprising a number of equipment units.

FIG. 1 shows a telecommunication network 1 associated with a system 2 at least some equipment units 3 of which, for example units 3A, 3B, 3C, communicate with each other via communication units 4, for example units 4A, 4B, 4C, that are part of network 1. In the embodiment envisaged here it is assumed that information is transmitted between the communicating units by radio, as symbolically represented by the antennas 5A, 5B, 5C, communication between two units using a given network channel.

The system 2 is assumed to include a plurality of equipment units that have to communicate with each other, only the equipment units that communicate with each other by radio being shown here, it being understood that this mode of communication is not necessarily exclusively used and that other equipment units of the system 2 that are not shown might be able to communicate via electrical wire or fiber optic links.

The system 2 is a railroad signaling network, for example, used for communication between various equipment units which here are assumed to have access to communication units, for example the units 4A, 4B, 4C, of the telecommunication network 1 in order to be able to communicate.

The equipment units of the system 2 include, for example, fixed infrastructure units here symbolized by the equipment unit 3A and mobile equipment units here symbolized by the equipment units 3B and 3C, the latter being individually incorporated into locomotives for pulling wagons along the tracks of the railroad network equipped with the system 2, for example.

The communication units shown here are each assumed to include a radio receiver unit 6 for receiving information and in particular commands and acknowledgements sent by radio to the equipment unit served by the receiver unit concerned from another communication unit. Each is assumed to include a transmitter unit 7 enabling the equipment unit concerned to transmit by radio to one or more other equipment units of the system via their respective communication units.

In accordance with the invention information in the form of digital data is transmitted between a transmitter unit 7 and one or more particular receiver units 6 via the telecommunication network 1 using a process combining a high level of reliability with a high level of security of transmission.

Reliability in respect of transmission of the information by a transmitter unit 6 allocated to an equipment unit of the system 2 is obtained by the use of an error detecting code that is applied to the digital data embodying the information to be transmitted by that transmitter unit.

The error code chosen is systematically applied to the digital data x corresponding to information to be transmitted to obtain a set of digital data y that can be defined by the equation $y=u(x,t)$ in which u is the encoding function and in which the term t is a time variable, variation of which allows dating and consequently detection of errors associated with time in the transmission of information.

A receiver unit 6 that receives the information data accompanied by error code data and which knows the error detecting code used for transmission is then able, in a manner that is known in itself, to verify that the received information data corresponds faithfully to the information data that was transmitted, or not, on the basis of the accompanying error detecting code data. Using an error detecting code including a parameter allowing for the passing of time enables a receiver unit to detect that information received does not correspond temporally to what it should be, for example because it is encoded with an error detecting code earlier than that currently being used.

Security in terms of transmission of information by a transmitter unit 7 is obtained by using an enciphering process the objectives of which are to authenticate the units concerned in transmitting information between a particular transmitter unit and one or more particular receiver units and to protect the information concerned, in particular the integrity of the information.

Here information is authenticated by using either a ticket-based process or encryption using a key.

In the case of a ticket-based process the structure of the information transmitted can be defined by the equation: $C=[u(x,t),T_t]$ where $u(x,t)$ is the redundancy of the information and where $T_t$ is a ticket whose value varies with time. This enables detection of any retransmission of old information because in this situation the information would have an expired ticket. Nevertheless an arrangement of the above kind is not totally secure given that the parameters $u(x,t)$ and $T_t$ can be dissociated from each other.

Dissociating them can be exploited to create illicitly new information that could be considered valid by a receiver unit if an appropriate parameter $T_t$ is associated with a parameter $u(x,t)$ the original parameter $T_t$ of which has been eliminated.

Figure 2:
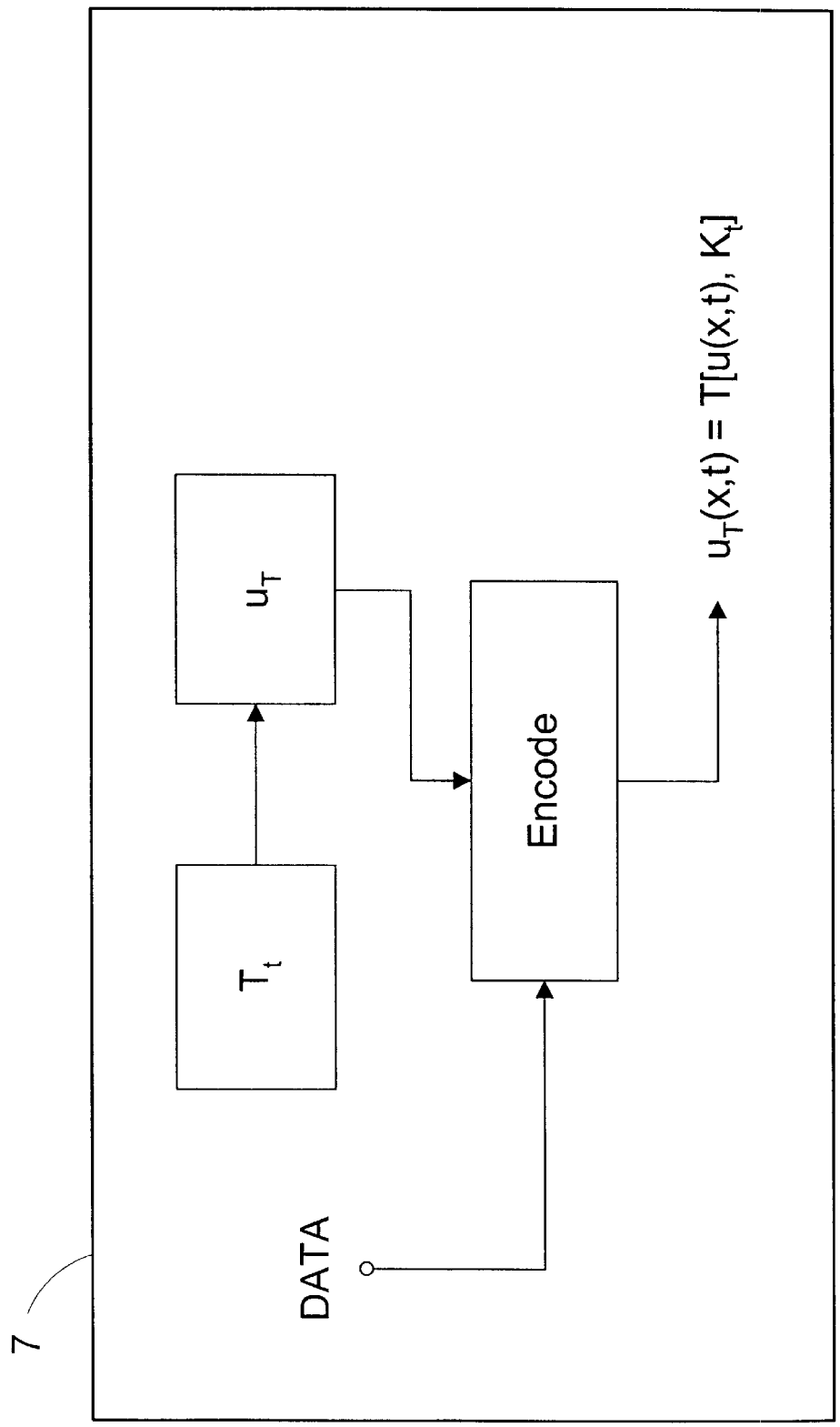
FIG. 2 is a diagram of an example of a first embodiment.

To eliminate this risk, in a first embodiment the function u is made dependent on the value of the ticket, which is equivalent to using the ticket as a key for enciphering u. The information transmitted by a unit can then be defined in the form $u_T(x,t)$ where $u_T$ is the encoding function depending on the negotiated key. An example of this embodiment is illustrated in FIG. 2. The error detecting code to be used to transmit information is then different in each communication session between the units.

The structure of the information transmitted can then be defined by the equation: $C=T[u(x,t),K_t]$ where $u(x,t)$ is the redundancy of the information and $K_t$ is the key which is assumed to vary in time and which consequently enables detection of any illicit retransmission of information.

The function T transforms the information in such a manner that $u(x,t)$ is no longer clearly identifiable in the set of data defined on the basis of the information by application of equation C.

Figure 3:
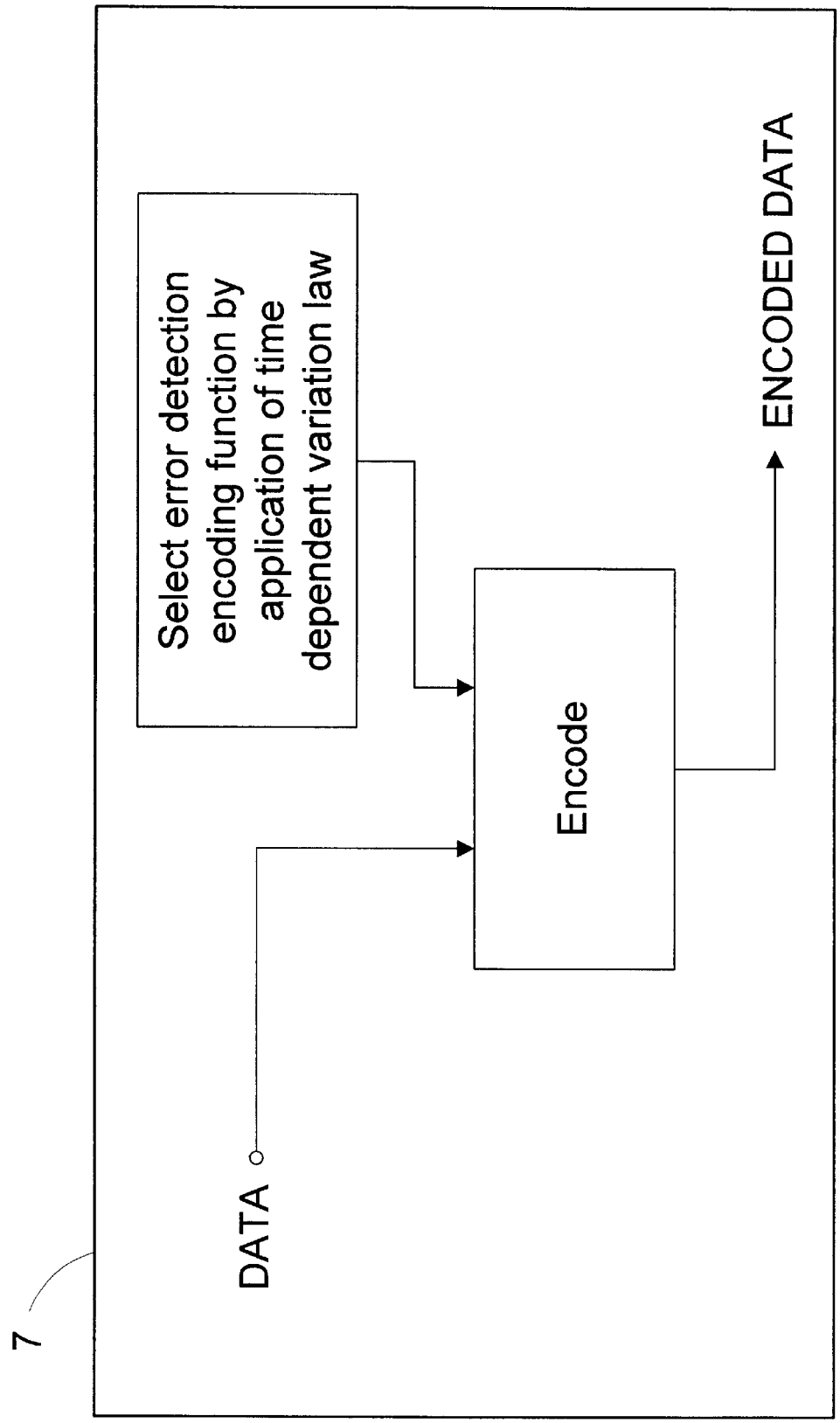
FIG. 3 is a diagram of an example of a second embodiment.

A second embodiment uses an error detecting code chosen by application of a time variation law that is known beforehand to the units concerned, for example, or selectively negotiated between those units during a preliminary negotiation phase. For example, an error detecting code is chosen for each new communication session involving transmission by a particular unit so that the codes used by that unit differ systematically from one session to another and so that it is preferably impossible to predict the use of a particular code for a new communication session between units from a knowledge of the codes previously used. An example of this embodiment is illustrated in FIG. 3.

It must be understood that a communication session as envisaged hereinabove, which could be reduced to transmission of a single item of information from a transmitter unit, can take other forms and in particular can involve exchange of information between particular units, for example two mobiles moving one behind the other on the same portion of rail track or of particular types for example a mobile unit and a unit constituting a fixed station.

It must also be understood that knowing a detecting code variation law can be common either to particular units or to particular types of units, as indicated hereinabove.

There is claimed:

1. A process for establishing communication between particular communication units via a channel of a telecommunication network, comprising:

defining an encrypting key which varies over time;

encrypting an error detecting code encoding function utilizing said encrypting key;

encoding data embodying information to be transmitted using the encrypted error detecting code encoding function; and transmitting said encoded data from a transmitter unit to one or more particular receiver units.

2. A process as claimed in claim 1, wherein said step of defining said encryption key comprises changing said encrypting key for each new communication session involving transmission of information from a particular transmitter unit.

3. A process as claimed in claim 2, wherein changing said encrypting key is performed during negotiation between the transmitter and receiver units concerned.

4. A process as claimed in claim 1, wherein said steps of defining said encryption key and encrypting the error detecting code encoding function together comprise using an error detecting code encoding function which is dependent on a ticket which changes over time.

5. A process as claimed in claim 4, wherein said ticket varies according to a time-dependent variation law known at both said transmitter unit and said one or more particular receiver units.

6. A process as claimed in claim 4, wherein said ticket varies by negotiation between said transmitter unit and said one or more particular receiver units.

7. A process for establishing communication between particular communication units via a channel of a telecommunication network, comprising:
   applying a time dependent variation law to select an error detecting code encoding function;
   generating an error detecting code for detection of errors in data embodying information to be transmitted, utilizing said error detecting code encoding function, prior to transmission;
   transmitting said data together with said error detecting code from a transmitter unit to one or more particular receiver units.

8. A process as claimed in claim 7, wherein said step of applying a time dependent variation law comprises changing said error detecting code encoding function for each new communication session involving transmission of information from a particular transmitter unit.

9. A process as claimed in claim 8, wherein changing said error detecting code encoding function is performed during negotiation between the transmitter and receiver units concerned.

* * * * *